May 21, 1957 E. WIEDEMANN 2,792,743
DEVICE FOR THE DIRECT INTERFEROMETRIC RECORDING
OF CHANGES IN REFRACTIVE INDEX GRADIENTS
Filed July 6, 1953 2 Sheets-Sheet 1

INVENTOR.
ERWIN WIEDEMANN

United States Patent Office 2,792,743
Patented May 21, 1957

2,792,743

DEVICE FOR THE DIRECT INTERFEROMETRIC RECORDING OF CHANGES IN REFRACTIVE INDEX GRADIENTS

Erwin Wiedemann, Riehen, near Basel, Switzerland, assignor, by mesne assignments, to Saul & Co., Newark, N. J., as nominee of Fidelity Union Trust Company Application July 6, 1953, Serial No. 366,292

Claims priority, application Switzerland October 3, 1952

7 Claims. (Cl. 88—14)

The present invention relates to a device for the direct interferometric recording of changes in refractive index gradients in solutions, i. e. for recording $$\frac{dn}{dx}/x$$

diagrams by means of interfering fringes, using cells of the normal width for such measurements (2–3 mm.), the device consisting of an optical system as described by Rayleigh and others, but so constructed that the first slit $SP_1$, or the grating replacing it, and the cylindrical lens system $ZY$, are made rotatable about the optical axis, while the interfering beams are made to cross in the region of the plane of the object by the use of known dioptric elements, such as pairs of double prisms, double mirrors or similar optical arrangements.

Svensson [Acta Chem. Scand. 3, 1170–1178 (1949)] was the first to show that, using interferometer systems of the type described by Rayleigh, but with the addition of an optical differentiation, it was possible to record $$\frac{dn}{dx}/x$$

diagrams. The condition for this is that the interfering beams pass through the same or two identical gradients with a slight relative displacement both in the vertical and in the horizontal plane. In electrophoresis, in diffusion measurements and in ultracentrifuge work, the main fields in which interferometric recordings of $$\frac{dn}{dx}/x$$

values are employed, the maximum displacement of the interfering beams in the plane of the object should be such that the vertical distance between them corresponds to half the height of a gradient, or approximately 1.0 mm., and the horizontal distance to about 6 mm.; with apparatus of the usual dimensions, this ensures that about 100 fringes fall within the useful field of the image.

When making diffusion measurements, Svensson [Acta Chem. Scand. 3, 1170–1178 (1949)] was able to satisfy these conditions by using a double cell, the centers of the two halves of which were approximately 6 mm. apart. He was thus able to produce two identical gradients, one of which was shifted approximately 1.0 mm. relative to the other. By passing the interfering beams through these two gradients, the desired $$\frac{dn}{dx}/x$$

diagram was obtained in the Rayleigh interferometer. This arrangement has the disadvantage that it requires the use of a double cell and is therefore not suitable for electrophoresis and ultracentrifuge work. In addition, there is some uncertainty regarding these measurements, since it is a matter of experience that it is very difficult to produce two exactly identical gradients.

Subsequently, Svensson [Acta Chem. Scand. 4, 1329–1346 (1950)] subjected the optical differentiation responsible for the production of the $$\frac{dn}{dx}/x$$

diagrams to theoretical treatment and showed that it is not necessary to direct the interfering beams through two identical gradients at different heights; the desired result can be achieved equally well by passing the two beams at different heights through the same gradient. For example, if two plane glass plates of suitable size are interposed in the path of one of the rays on each side of the cell and tilted in opposite directions, the two beams pass through the cell parallel to the optical axis but separated by about 1.0 mm. from one another and are then brought together again. In this way, the desired $$\frac{dn}{dx}/x$$

diagram can be obtained in the Rayleigh interferometer from a single gradient. An arrangement of this type thus eliminates the necessity for a double cell and for two gradients, but requires cells of considerable width in order to satisfy the condition that the two beams shall be separated in the horizontal plane by a distance of about 6 mm. For this reason, this arrangement is not suitable either for electrophoresis or for ultracentrifuge work, since in both cases it is impossible to use cells of a width greater than 3 mm., not only on account of the increased volumes of solution required, but also because the entire construction of the apparatus would have to be altered. No practical experiments in electrophoresis or ultracentrifuge work with this or similar arrangements have therefore been described so far.

It was not to be anticipated that relatively simple devices could be constructed which would enable the required relative displacement of the interfering beams by about 1.0 mm. in the vertical plane and 6 mm. in the horizontal plane to be attained using cells of the normal 2–3 mm. width, thus making the interferometric recording of $$\frac{dn}{dx}/x$$

diagrams generally applicable, both in electrophoresis and in ultracentrifuge work.

According to the present invention, the required vertical displacement of the two interfering beams is achieved by a device enabling both the vertical slit $SP_1$ [E. Wiedemann, Helv. Chim. Acta 35, 82–92 (1952)], or the grating replacing it, and the cylindrical lens system $ZY$ to be rotated [E. Wiedemann, Helv. Chim. Acta 35, 82–92 (1952)]. In order to direct the two interfering beams having a lateral separation of 6 mm. through a cell of only 2–3 mm. width, pairs of double prisms $P_1$ and $P_2$ or equivalent dioptric elements are placed in the path of the interfering beams so that they are made to cross in the center of the cell.

On the accompanying sheet of drawings.

Figure 1:
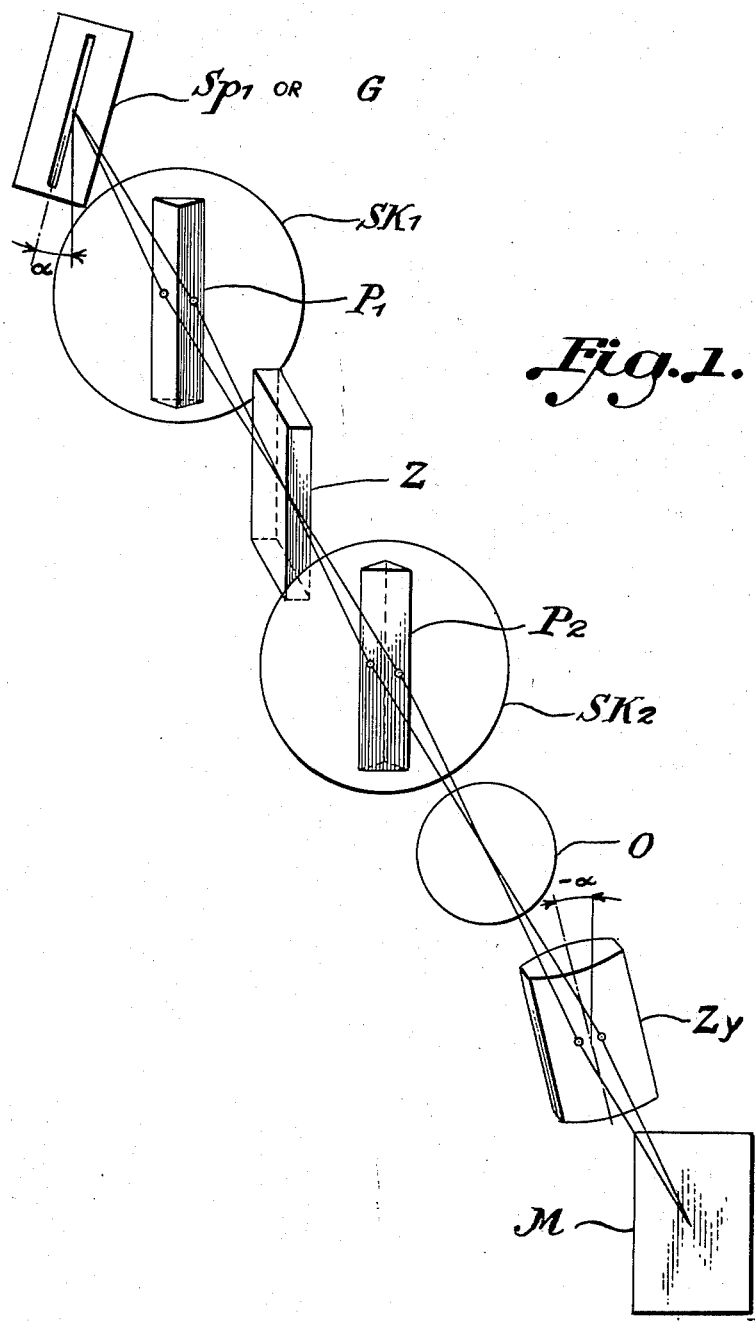
Fig. 1 is a diagrammatic showing of an embodiment of the invention.

In Fig. 1, in the direction of passage of the light, the letters have the following significance:

SP₁—first slit rotatable through an angle α (the corresponding grating which may replace SP₁ is represented by G)
SK₁—first collimator lens
P₁—first double prism
Z—cell
P₂—second double prism
SK₂—second collimator lens
O—objective for providing an image of the cell on screen M
ZY—cylindrical lens system rotatable through an angle —α
M—ground glass screen or film This system operates as follows:

If SP₁ and ZY are vertical and P₁ and P₂ are absent, the two interfering pencils of light between SK₁ and SK₂ will lie in the same horizontal plane and be parallel to the optical axis. If, at the same time, Z is situated in the path of one of the coherent beams indicated, then the arrangement will correspond in every particular to Fig. 4 in the publication by E. Wiedemann: Helv. Chim. Acta 35, 86 (1952). If SP₁ or G is turned through an angle α and ZY rotated through the same angle α, it is possible to obtain $$\frac{dn}{dx}/x$$

diagrams of refractive index gradients without the aid of P₁ and P₂, i. e. with parallel, coherent beams, provided that the beams pass through a cell Z of sufficient width, since they are then separated by the required distance both in the vertical and in the horizontal plane. However, in order to make possible the use of normal cells of 2–3 mm. width and thus render the invention suitable for electrophoretic and ultra-centrifuge measurements, it is necessary that the two beams should be brought together. This can be achieved if the interfering beams are made to cross by means of P₁ and P₂. The only consequence of this crossing of the two beams is that ZY has to be turned through an angle —α instead of through an angle α.

Figure 2:
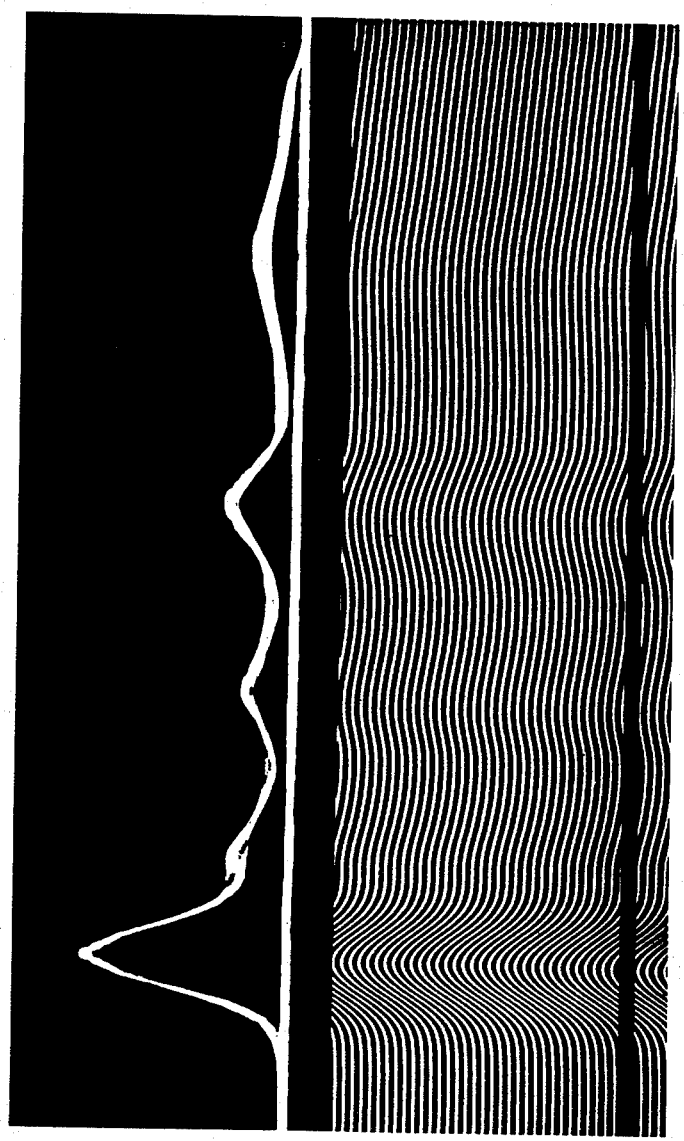
Fig. 2 is a diagram obtained by means of the embodiment according to Fig. 1.

Fig. 2 shows a diagram obtained by means of the arrangement illustrated in diagrammatic form in Fig. 1, a grating having been used in place of the first slit and a line of reference introduced by stretching a fine wire across the focal plane of the collimator lens SK₂. The diagram represents the result of an electrophoretic experiment carried out with pathological human serum. The angle α was ±10° and the width of the cell 3 mm.

Instead of using a pair of double prisms P₁ and P₂, use may also be made of a pair of double mirrors or of a combination of prisms and mirrors, whereby in the first case the crossing over of the interfering beams is effected by double reflexion and in the second case by refraction and reflexion.

Having thus disclosed the invention, what is claimed is:

1. A device for producing a direct recording of changes in refractive index gradients in solutions, i. e.

$$\frac{dn}{dx}/x$$

diagrams by means of interference fringes, on a screen or photograph plate, comprising a slitted element tilted about an axis through the center thereof and perpendicular to the plane of said slitted element, said element being to receive monochromatic light from a light source, a set of two spaced collimator lenses for receiving light from said slitted element, means between said collimator lenses for crossing beams of light from said slitted element between said lenses, a cell containing a solution under examination at the point between said collimator lenses where the beams of light are crossed, an objective for receiving light from said collimator lenses and forming an image of said slitted element in the vertical plane, and a cylindrical lens tilted about its optical axis the same amount as said slitted element for receiving the image from said objective and projecting on the screen or photograph plate.

2. A device according to claim 1, wherein said slitted element comprises a screen having single slit.

3. A device according to claim 1, wherein said slitted element comprises a slitted grating.

4. A device according to claim 3 wherein said grating and the cylindrical lens are inclined in opposite directions at the same angle.

5. A device according to claim 1, wherein said beam-crossing means comprises dioptric elements.

6. A device according to claim 5, wherein said dioptric elements comprise pairs of double prisms, whereby the crossing over of the interfering beams is brought about by double refraction.

7. A device for producing a direct recording of changes in refractive index gradients in solutions, i. e.

$$\frac{dn}{dx}/x$$

diagrams by means of interference fringes, on a screen or photograph plate, comprising a slitted element tilted about an axis through the center thereof and perpendicular to the plane of said slitted element, said element being to receive monochromatic light from a light source, a set of two spaced collimator lenses for receiving light from said slitted element, a set of two spaced dioptric elements between said collimator lenses for crossing beams of light from said slitted element between themselves, a cell containing a solution under examination between said dioptric elements at the point where the beams of light are crossed, an objective for receiving light from said collimator lenses and forming an image of said slitted element in the vertical plane, and a cylindrical lens tilted about its optical axis the same amount as said slitted element for receiving the image from said objective and projecting it on the screen or photograph plate.

References Cited in the file of this patent

FOREIGN PATENTS

| | | |
|---|---|---|
| 355,911 | Great Britain | Sept. 3, 1931 |
| 595,211 | Germany | Apr. 12, 1934 |
| 923,701 | France | Feb. 24, 1947 |
| 261,670 | Switzerland | May 31, 1949 |

OTHER REFERENCES

Jaffe: "Measurement of Refractive Indexes of Liquids in the Infrared," vol. 41, No. 3, Journal of the Optical Society of America, pages 166–178, March 1951.